(12) United States Patent
Cole et al.

(10) Patent No.: US 9,845,203 B1
(45) Date of Patent: Dec. 19, 2017

(54) SINGULATING CONVEYOR SYSTEM

(71) Applicant: Integrated Solutions, Inc., Memphis, TN (US)

(72) Inventors: David A. Cole, Memphis, TN (US); Steve Usher, Memphis, TN (US)

(*) Notice: Subject to any disclaimer, the term of this patent is extended or adjusted under 35 U.S.C. 154(b) by 0 days.

(21) Appl. No.: 15/224,479

(22) Filed: Jul. 29, 2016

(51) Int. Cl.
*B65G 47/00* (2006.01)
*B65G 47/24* (2006.01)
*B65G 13/02* (2006.01)
*B65G 13/11* (2006.01)
*B65G 47/31* (2006.01)

(52) U.S. Cl.
CPC ............. *B65G 47/24* (2013.01); *B65G 13/02* (2013.01); *B65G 13/11* (2013.01); *B65G 47/31* (2013.01); *B65G 2811/0626* (2013.01)

(58) Field of Classification Search
CPC ...... B65G 47/682; B65G 47/24; B65G 47/31; B65G 13/02; B65G 13/11
USPC ................................................ 198/458, 443
See application file for complete search history.

(56) References Cited

U.S. PATENT DOCUMENTS

| | | | | |
|---|---|---|---|---|
| 4,039,074 A | * | 8/1977 | Maxted | B65G 47/31 198/456 |
| 4,044,897 A | * | 8/1977 | Maxted | B65G 47/71 198/349 |
| 4,241,825 A | * | 12/1980 | Brouwer | B65G 39/09 193/35 R |
| 4,284,186 A | * | 8/1981 | Brouwer | B65G 13/04 198/415 |
| 5,240,101 A | * | 8/1993 | LeMay | B65G 47/682 198/443 |
| 5,400,896 A | * | 3/1995 | Loomer | B65G 47/71 198/415 |
| 5,415,281 A | * | 5/1995 | Taylor | B65G 47/682 198/448 |
| 6,253,905 B1 | * | 7/2001 | Pelka | B65G 47/082 198/415 |
| 6,269,933 B1 | * | 8/2001 | Schuitema | B65G 47/5145 198/370.1 |
| 6,609,607 B2 | | 8/2003 | Woltjer | |
| 9,315,341 B2 | * | 4/2016 | Leist | B65G 47/681 |

* cited by examiner

*Primary Examiner* — William R Harp
(74) *Attorney, Agent, or Firm* — David J Kreher (57) ABSTRACT

A singulating system within a conveyor system for the purpose of singulating and orienting jumbled, randomly oriented packages into packages that are conveyed in a single file line wherein each package is oriented such that the long axis of each package is oriented along the direction of flow of the conveyor system that consists of a plurality of conveyor sets that together rotate, reorient, space, and align packages, as well as a method of singulating packages.

4 Claims, 8 Drawing Sheets

SINGULATING CONVEYOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This invention relates to a singulating system to be used in conveyor systems as well as the method of operation of said singulating system, wherein the singulating system is capable of receiving continuous flow of randomly positioned, oriented and sized packages, which are then sorted into a single file line, where the packages are generally oriented so that the long axis of each package is along the direction of flow of the conveyor system. This singulating system is further designed to be integrated into existing conveyor systems or included in newly designed conveyor systems.

Background of the Invention

Many types of facilities around the world use package handling systems. These package handling systems frequently involve conveyor systems designed to move packages from one location to another. As the number of packages required to be moved has increased, the desire has arisen to include automation within the conveyor systems so that the packages could be sorted into groups, including but certainly not limited to content, size, type, destination, and delivery method. Most sorting methods are based on a system whereby each package has a label of some sort capable of being read by a scanning device and that scanning device is then capable monitoring each package through the conveyor system in order to assure each package reaches its appropriate destination for further handling. Inherent in the system is that each package must go by the scanning device one at a time so as to ensure the package does not get misrouted or lost. Thus, there is a need for a conveyor system that can take a continuous feed of packages that are jumbled, of different sizes and various orientations, and sort the collection into a single file line where the packages are correctly oriented, so that each can be read by the scanning device.

This singulating system is capable of receiving a continuous feed of packages that are jumbled, of different sizes and various orientations and sort the collection into a single file line where the packages are correctly oriented. This singulating system is further designed to be integrated into existing conveyor systems or included in newly designed conveyor systems.

SUMMARY OF THE INVENTION

The present disclosure is of a singulating system which is integrated into a conveyor system whereby the singulating system is capable of receiving a continuous flow of jumbled, randomly oriented packages and sorting the packages so that, as the packages move through the singulating system of the conveyor system, the packages are arranged into a single file line wherein each package is oriented such that the long axis of each package is oriented along the direction of flow of the conveyor system through the use of a plurality of conveyor sets.

Each conveyor set of the plurality of conveyor sets comprises a left attachment and a right attachment, a plurality of rollers, and a drive. The plurality of rollers are attached to the left attachment and the right attachment in such a fashion so as allow the plurality of rollers to rotate and so that the top edge of each roller creates a plane across which packages traverse.

The rollers can be arranged to impact the direction of flow of the packages as they are transported by the conveyor system. In one configuration the rollers are oriented perpendicular to the flow of the packages. In this configuration the packages remain positioned in the same area between the left attachment and the right attachment, so long as the path the package is traversing is straight and no outside force acts on the package.

In a skewed configuration, rollers are arranged so that they are not perpendicular to the flow of the conveyor system. The skewed configuration causes a package conveyed on the conveyor set in the direction of the conveyor set and toward the left attachment or right attachment. If the angle of skew created between the axis of the left attachment from the connection point of the roller, in the direction of travel and the axis of the roller is less than 90 degrees, a package on the conveyor set will travel along the conveyor set and toward the left attachment. If the angle of skew created between the axis of the right attachment from the connection point of the roller, in the direction of travel and the axis of the roller is less than than 90 degrees, a package on the conveyor set will travel along the conveyor set and toward the right attachment. In the skewed configuration, the greater the difference is between perpendicular and the angle of skew between the axis of the rollers and the left attachment or right attachment respectively, the faster a package traversing the conveyor set is directed towards the left attachment or right attachment.

A drive of the conveyor set includes any mechanism capable of facilitating the rotation of the plurality of rollers including but not limited to chain driven, belt driven or gear driven. The rollers within a conveyor set may operate at the same rate as the rollers in another conveyor set or at a different rate. If the rate of rotation of the rollers within a conveyor set is the same as the rate of rotation of the rollers in the immediately succeeding roller set, the distance between a package and a subsequent package will remain the same as the packages travel from the first roller set to the second roller set. If the rate of rotation of the rollers within a conveyor set is the slower than the rate of rotation of the rollers in the immediately succeeding roller set, the distance between a package and a subsequent package will increase as the packages travel from the first roller set to the second roller set. If the rate of rotation of the rollers within a conveyor set is faster than the rate of rotation of the rollers in the immediately succeeding roller set, the distance between a package and a subsequent package will decrease as the packages travel from the first roller set to the second roller set.

The present disclosure reveals the use of a plurality of conveyor sets wherein first, the rollers within conveyor sets oriented in a skewed arrangement and second the rollers within conveyor sets rotate at a different rate from the rollers within other conveyor sets, which results in the packages traveling along the conveyor system that begin as a continuous flow of jumbled, randomly oriented packages and results in sorting the packages so that the packages are arranged into a single file line wherein each package is oriented such that the long axis of each package is oriented along the direction of flow of the conveyor system. In particular, as packages enter the first conveyor set of the singulating system, the skewed pattern conveys the package in the direction of flow and toward the attachment, as the package crosses the attachment it enters an adjacent conveyor set operating at a different rate than the first conveyor set and the skewed pattern of this conveyor set is at a greater angle than the first conveyor set. The change in speed increases the distance between packages, which combined with the larger angle of skew of the second conveyor set relative to the first conveyor set allows adjacent packages to slip between other packages as the packages cross from one conveyor set to the next. The packages then enter a conveyor set with perpendicular rollers. A subsequent conveyor set is in a skewed arrangement but where the packages are conveyed toward the opposite attachment. The packages are then conveyed across the attachment to an adjacent conveyor set that is operating at a different rate than the previous conveyor set and where the rollers are in a skewed arrangement, but where the angle is greater than the previous angle. The change in the rate of travel again allows the distance between packages to increase and the difference in the skewed angle between the conveyor sets drives the non-single file packages into the created gaps. The packages then travel along and across the conveyor set to a rail where the packages are now in a single file line.

DETAILED DESCRIPTION OF THE INVENTION

A singuating system 1 to be used within a conveyor system for the purpose of singulating and orienting jumbled, randomly oriented packages 60 into packages 60 that are conveyed in a single file line wherein each package is oriented such that the long axis of each package is oriented along the direction of flow of the conveyor system along a conveyor system comprising a plurality of conveyor sets 2.

Figure 1:
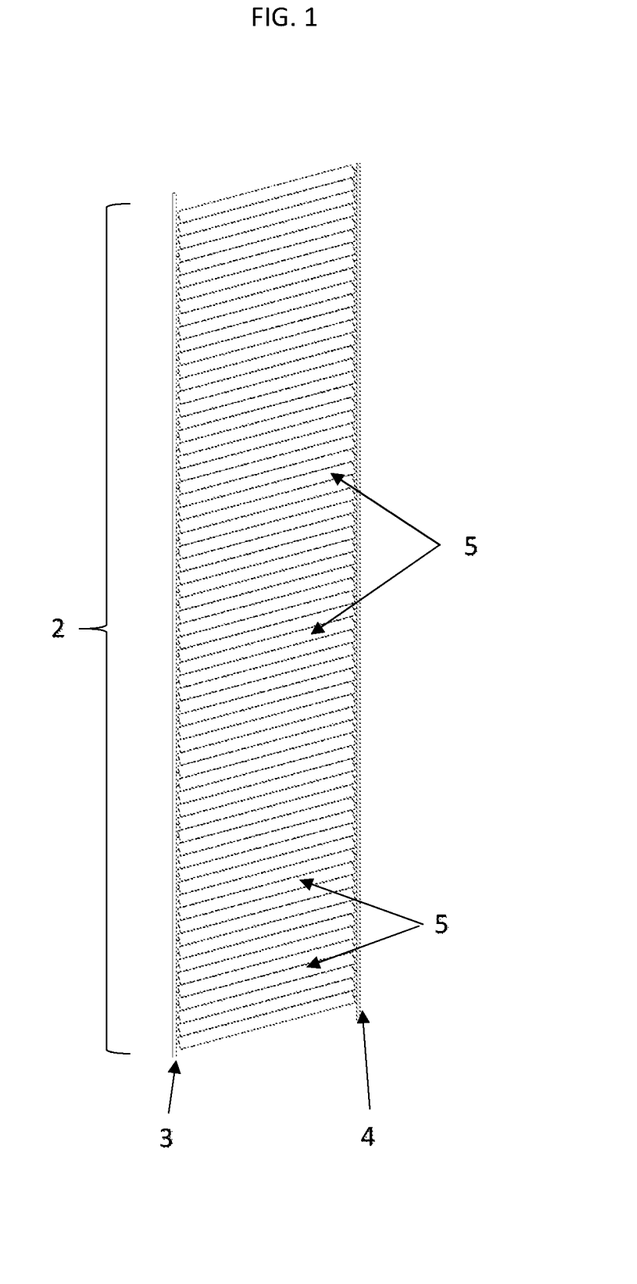
FIG. 1 is a plan view of an example of a conveyor set including a left attachment, a right attachment, and a plurality of rollers.
Figure 2:
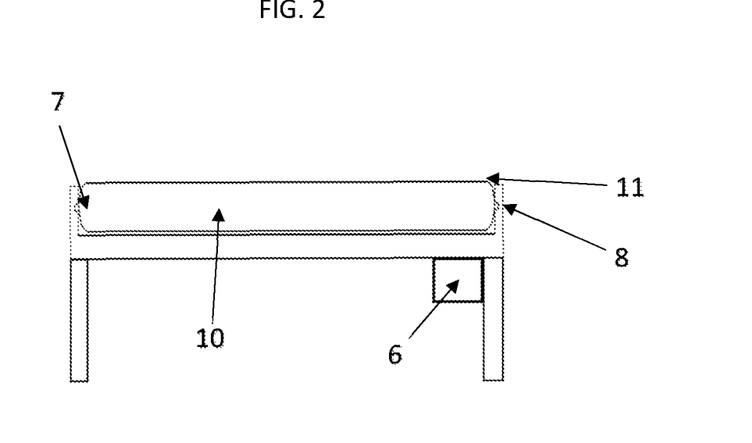
FIG. 2 is a side view of a sample conveyor set including the top edge of the rollers, which creates a plane across which packages can travel, as well as the drive.

Each conveyor set 2 of the plurality of conveyor sets 2 comprises a left attachment 3, a right attachment 4, a plurality of rollers 5, and a drive 6. Each roller 5 in the plurality of rollers 5 comprises a left end 7, a right end 8 and an axis 9. The plurality of rollers 5 are attached to the left attachment 3 and the right attachment 4 in such a fashion so as allow the plurality of rollers 5 to rotate and so that the top edge 10 of each roller creates a plane 11 across which packages 60 traverse.

Figure 3A:
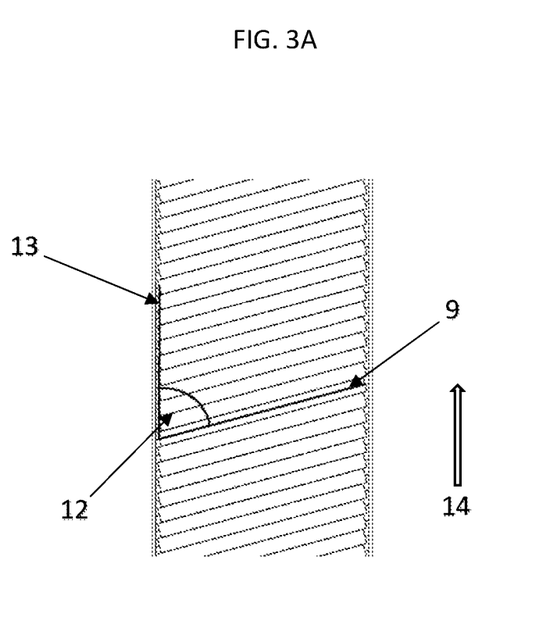
FIG. 3A is a view of the angle associated with an angle relative to the left attachment, as defined by the angle between the axis of the roller and that line along the left attachment from the point where the left end of the roller attaches to the left attachment, in the direction of flow of the packages.
Figure 3B:
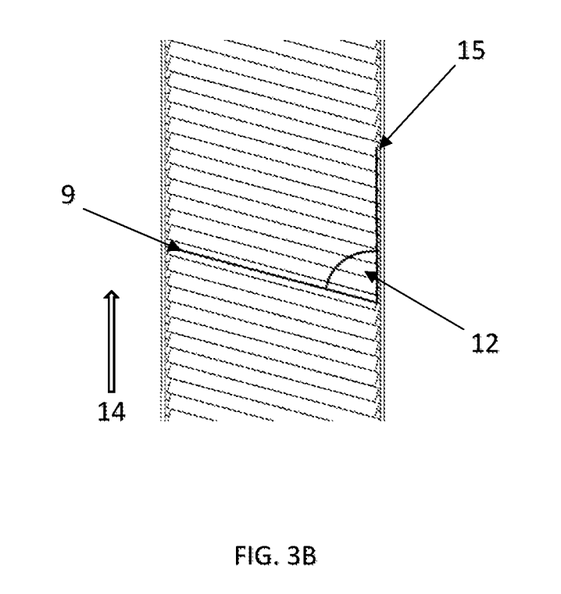
FIG. 3B Is a view of the angle associated with an angle relative to the right attachment, as defined by the angle between the axis of the roller and that line along the right attachment from the point where the right end of the roller attaches to the right attachment, in the direction of flow of the packages.

An angle 12 exists between each roller 5 of the plurality of rollers 5 and the left attachment 3 or the right attachment 4, said angle 12 being the same for each roller 5 within a conveyor set 2. For the angle 12 relative to the left attachment 3, the angle 12 is defined by the angle between the axis 9 of the roller 5 and that line 13 along the left attachment 3 from the point where the left end 7 of the roller 5 attaches to the left attachment 3, in the direction of flow 14 of the packages 60. For the angle 5 relative to the right attachment 4, the angle 12 is defined by the angle 12 between the axis 9 of the roller 5 and that line 15 along the right attachment 4 from the point where the right end 8 of the roller 5 attaches to the right attachment 4, in the direction of flow 14 of the packages 60.

The drive 6 comprises a mechanism capable of facilitating the rotation of the plurality of rollers 5 including but not limited to chain driven, belt driven or gear driven.

Figure 4:
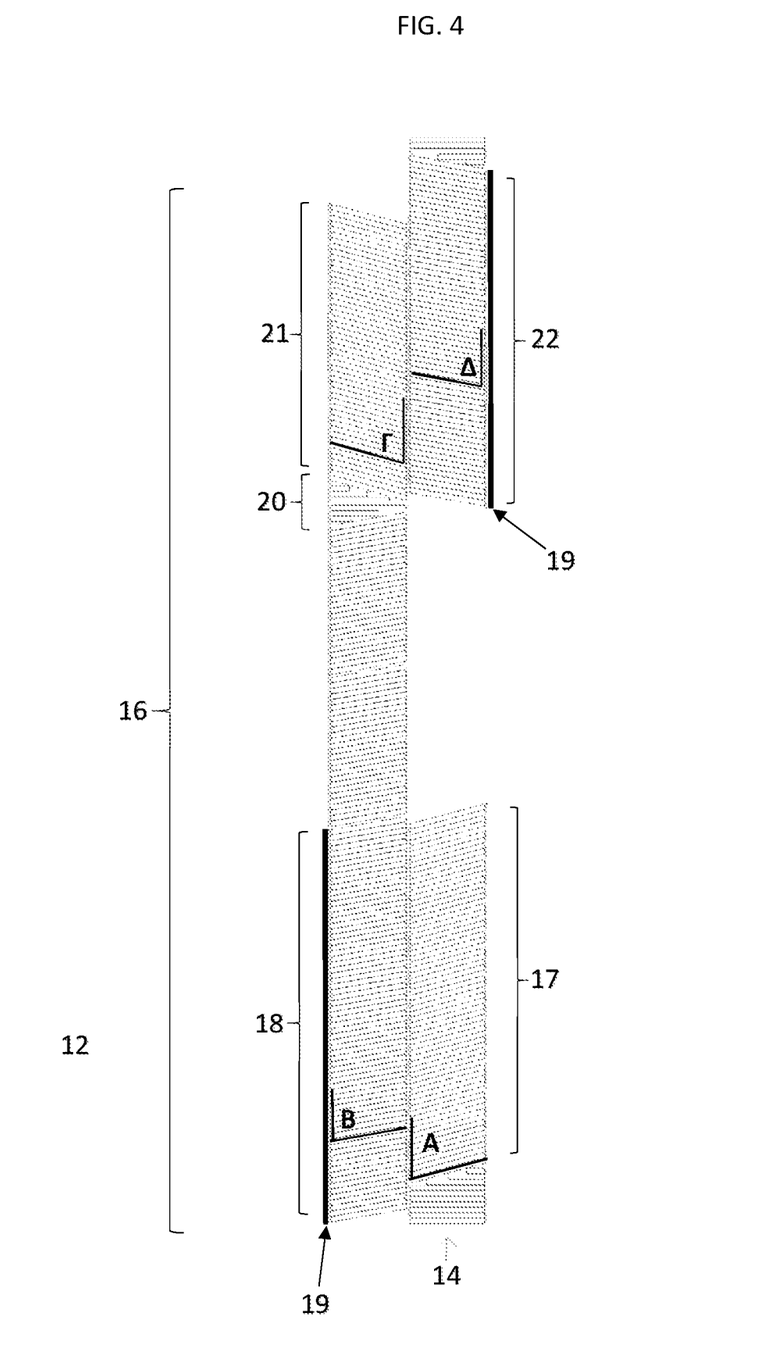
FIG. 4 is a plan view of the first embodiment of the singulating system.

In the first embodiment 16 of the singlating system 1 packages 60 enter a first conveyor set 17 of the plurality of conveyor sets 2 of the singulating system 1, said first conveyor set 17 comprising a plurality of rollers 5 in a skewed arrangement, where the angle 12 of the rollers is A. As packages 60 travel across the first conveyor set 17 the arrangement of the plurality of rollers 5 cause the packages 60 to also travel toward the left attachment 3. When the packages 60 reach the left attachment 3 each package crosses over the left attachment 3 and the right attachment 4 of a second conveyor set 18 of the plurality of conveyor sets 2. The second conveyor 18 set comprises a plurality of rollers 5 in a skewed arrangement wherein the angle 12 of the rollers in the second conveyor set 18 is angle B, which is greater than the angle, A, of the first conveyor set 17. The second conveyor 18 set also operates at a rate that is faster than the rate at which the first conveyor 17 set operates. The difference in rate between the first conveyor set 17 and the second conveyor set 18 causes the distance between packages 60 to increase as packages 60 cross from the first conveyor set 17 to the second conveyor set 18. The change between angle 12, A and angle 12, B causes packages 60, as packages 60 cross from the first conveyor set 17 to the second conveyor set 18, to be driven into the distance between packages 60 created by the increased speed.

As packages 60 travel along the second conveyor set 18 they are also directed toward the left attachment 3. Once the packages 60 reach the left attachment 3 of the second conveyor set 18 they encounter a rail 19 which prevents packages 60 from sliding off the second conveyor set 18. Packages 60 that were originally side by side on the first conveyor set 17 may also enter the gap created between packages 60 as a result of the change in rate at this time.

As packages 60 continue to travel through the singulating system 1, they encounter a first transition conveyor set 20 of the plurality of conveyor sets 2, wherein rollers 5 are arranged perpendicularly to the direction of flow. A subsequent conveyor set, a third conveyor set 21 of the plurality of conveyor sets 2, comprises a plurality of rollers 5 in a skewed arrangement with an angle 12, angle Γ. The third conveyor set 21 may operate at a rate different from previous conveyor sets to again allow the space between packages 60 to increase as packages 60 travel from the transition conveyor set 20 to the third conveyor set 21. As packages 60 travel along the third conveyor set 21 the rollers 5 also convey the packages 60 toward the right attachment 4. When the packages 60 reach the right attachment 4, the packaged cross the right attachment 4 and the left attachment 3 of a fourth conveyor set 22 of the plurality of conveyor sets 2. The fourth conveyor set 22 comprises a plurality of rollers 5 in a skewed arrangement wherein the angle 12 of the plurality of rollers 5 in the fourth conveyor set 22 is angle Δ, which is greater than the angle 12, Γ, of the third conveyor set 21. The fourth conveyor set 22 also operates at a rate that is faster than the rate at which the third conveyor set 21 operates. The difference in rate between the third conveyor set 21 and the fourth conveyor set 22 causes the distance between packages 60 to increase as packages 60 cross from the third conveyor set 21 and the fourth conveyor set 22. The change between angle 12, Δ and angle 12, T causes packages 60 to be driven into this gap.

As packages 60 travel along the fourth conveyor set 22 they are also directed toward the right attachment 5. Once the packages 60 reach the right attachment 4 of the fourth conveyor set 22 they encounter a rail 19 which prevents packages 60 from sliding off the fourth conveyor set 22.

Figure 5:
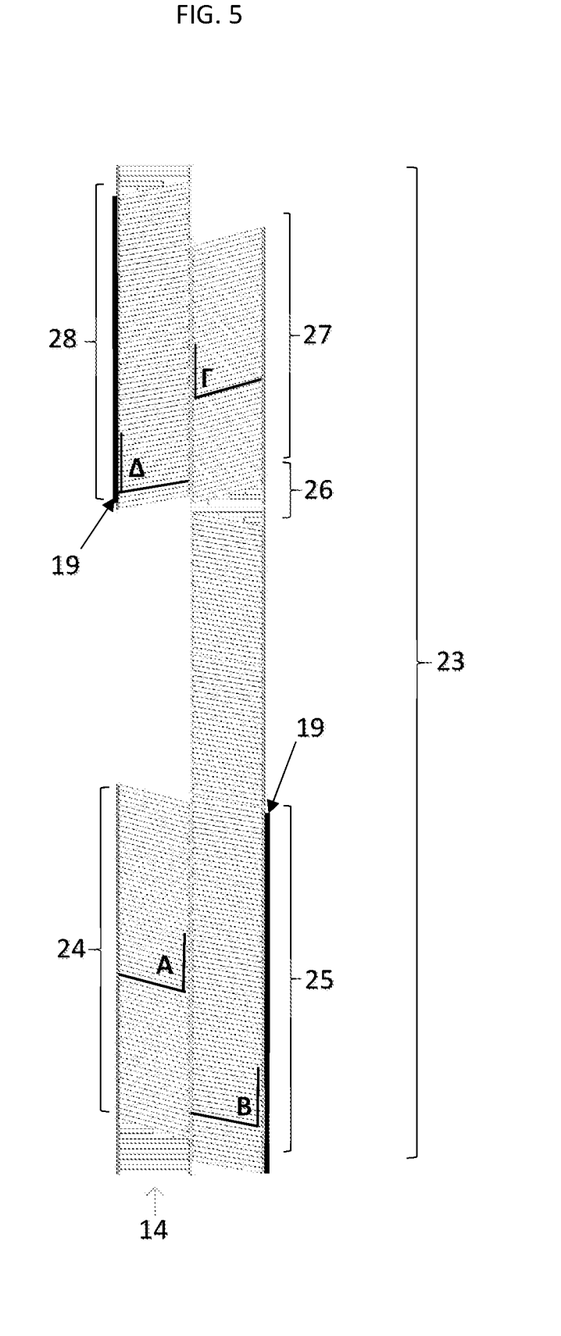
FIG. 5 is a plan view of the second embodiment of the singulating system.

In the second embodiment 23 of the singulating system 1 packages 60 enter a first conveyor set 24 of the plurality of conveyor sets 2 of the singulating system 1, said first conveyor set 24 comprising a plurality of rollers 5 in a skewed arrangement, where the angle 12 of the rollers is A. As packages 60 travel across the first conveyor set 24 the arrangement of the plurality of rollers 5 cause the packages 60 to also travel toward the right attachment 4. When the packages 60 reach the right attachment 4 each package crosses over the right attachment 4 and the left attachment 3 of a second conveyor set 25 of the plurality of conveyor sets 2. The second conveyor set 25 comprises a plurality of rollers 5 in a skewed arrangement wherein the angle 12 of the plurality of rollers 5 in the second conveyor set 25 is angle 12, B, which is greater than the angle 12, A, of the first conveyor set 24. The second conveyor set 25 also operates at a rate that is faster than the rate at which the first conveyor set 24 operates. The difference in rate between the first conveyor set 24 and the second conveyor set 25 causes the distance between packages 60 to increase as packages 60 cross from the first conveyor set 24 to the second conveyor set 25. The change between angle 12, A and angle B, causes packages 60 to be driven into this gap.

As packages 60 travel along the second conveyor set 25 they are also directed toward the right attachment 4. Once the packages 60 reach the right attachment 4 of the second conveyor set 25 they encounter a rail 19 which prevents packages 60 from sliding off the second conveyor set 25. Packages 60 that were originally side by side on the first conveyor set 24 may enter the gap created between packages 60 as a result of the change in rate.

As packages 60 continue to travel through the singulating system 1, they encounter a transition conveyor set 26 of the plurality of conveyor sets 2, wherein rollers are arranged perpendicularly to the direction of flow. A subsequent conveyor set, a third conveyor set 27 of the plurality of conveyor sets 2, comprises a plurality of rollers 5 in a skewed arrangement with an angle 12, angle Γ. The third conveyor set 27 may operate at a rate different from previous conveyor sets to again allow the space between packages 60 to increase as packages 60 travel from the transition conveyor set 26 to the third conveyor set 27. As packages 60 travel along the third conveyor set 27 the plurality of rollers 5 also convey the packages 60 toward the left attachment 3. When the packages 60 reach the left attachment 3, the packaged cross the left attachment 3 and the right attachment 4 of a fourth conveyor set 28 of the plurality of conveyor sets 2. The fourth conveyor set 28 comprises a plurality of rollers 5 in a skewed arrangement wherein the angle 12 of the plurality of rollers 5 in the fourth conveyor set 28 is angle Δ, which is greater than the angle 12, T, of the third conveyor set 27. The fourth conveyor set 28 also operates at a rate that is faster than the rate at which the third conveyor set 27. The difference in rate between the third conveyor set 27 and the fourth conveyor set 28 causes the distance between packages 60 to increase as packages 60 cross from the third conveyor set 27 to the fourth conveyor set 28. The change between angle 12, Δ and angle B, Γ causes packages 60 to be driven into this gap.

As packages 60 travel along the fourth conveyor set 28 they are also directed toward the left attachment 3. Once the packages 60 reach the left attachment 3 of the fourth conveyor set 28 they encounter a rail 19 which prevents packages 60 from sliding off the fourth conveyor set 28.

Figure 6:
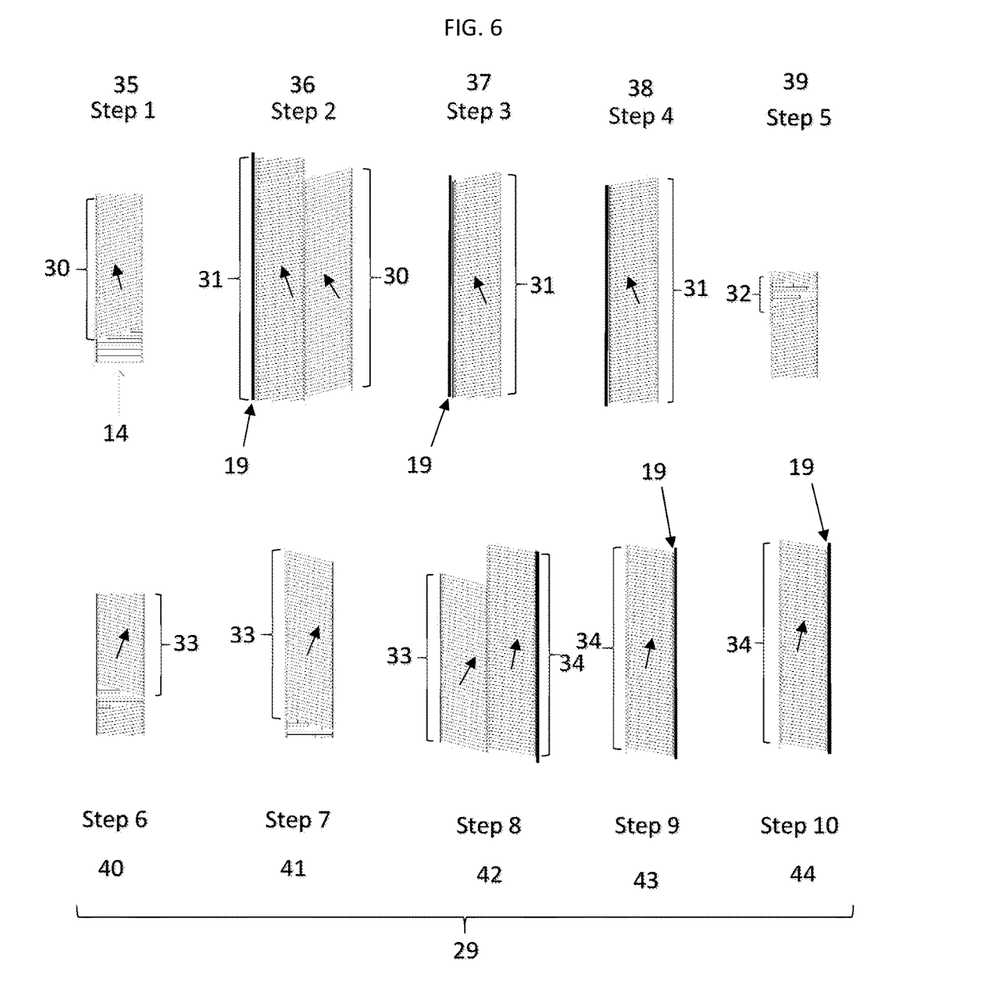
FIG. 6 is a diagram of the method of the first embodiment of the singulating process.

The first embodiment 29 of a method of singulating and orienting jumbled, randomly oriented packages 60 into packages 60 that are conveyed in a single file line wherein each package is oriented such that the long axis of each package is oriented along the direction of flow of the conveyor system along a conveyor system comprising the following steps.

A collection of packages 60 enters a singulating system, wherein the singulating system comprises a first conveyor set 30, a second conveyor set 31, a transitional conveyor set 32, a third conveyor set 33, and a fourth conveyor set 34, wherein each of the conveyor sets comprise a left attachment 3, a right attachment 4, a plurality of rollers 5, and a drive 6. First, 35 packages 60 enter the first conveyor set 30, wherein the plurality of rollers 5 are arranged in a skewed arrangement with an angle 12 A between the axis 9 of the plurality of rollers 5 and the left attachment 3, which directs the flow of packages 60 toward the left attachment 3.

Second 36, the packages 60 are conveyed across the left attachment 3 of the first conveyor set 30 and the right attachment 4 of the second conveyor set 31, wherein the plurality of rollers 5 of the second conveyor set 31 are in a skewed arrangement with an angle 12 B between the axis 9 of the plurality of rollers 5 and the left attachment 3, and the second conveyor set 31 operates a rate faster than the first conveyor set 30, which causes the space between packages 60 to increase and a package 60 can be slid into the gap between packages 60 because the angle A of the first conveyor 30 set is greater than the angle B of the second conveyor set 31.

Third 37, the packages 60 are conveyed across the second conveyor set 31, to toward the left attachment 3 because of the skewed arrangement of the plurality of rollers 5.

Fourth 38, some of the packages 60 reach the left attachment and are stopped from sliding off the second conveyor set 31 by a rail 19. During this time, some packages 60 move between other packages 60 as a result of the space created between packages 60 in the second step 36.

Fifth 39, the packages 60 are conveyed across a transitional conveyor set 32 wherein the rollers of this conveyor set 32 are oriented perpendicular to the direction of flow of the singulating system 1.

Sixth 40, the packages 60 are conveyed to a third conveyor set 33, wherein the plurality of rollers 5 of the third conveyor set 33 are in a skewed arrangement with an angle 12 Γ between the axis 9 of the rollers and the right attachment 4, the third conveyor set 33 also operates at a rate faster than the rate at which the transitional conveyor set 32 operates.

Seventh 41, the packages 60 are conveyed along the third conveyor set 33 and toward the right attachment 4.

Eighth 42, the packages 60 are conveyed across the right attachment 4 of the third conveyor set 33 and the left attachment 3 of the fourth conveyor set 34, wherein the plurality of rollers 5 of the fourth conveyor set 34 are in a skewed arrangement with an angle 12 Δ between the axis 9 of the plurality of rollers 5 and the right attachment 4, wherein the fourth conveyor set 34 operates a rate faster than the third conveyor set 33, which allows the space between packages 60 to increase and a package 60 can be slid into the gap between packages 60 because the angle Γ of the third conveyor 33 set is greater than the angle Δ of the fourth conveyor set 34.

Ninth 42, the packages 60 are conveyed across the fourth conveyor set 34, to toward the right attachment 4 of the fourth conveyor set 34.

Tenth 43, the packages 60 reach the right attachment 4 and reach a rail 19 that prevent packages 60 from sliding off the fourth conveyor set 34. During this time, some packages 60 move between other packages 60 as a result of the space created between packages 60 in the eighth step 41.

Figure 7:
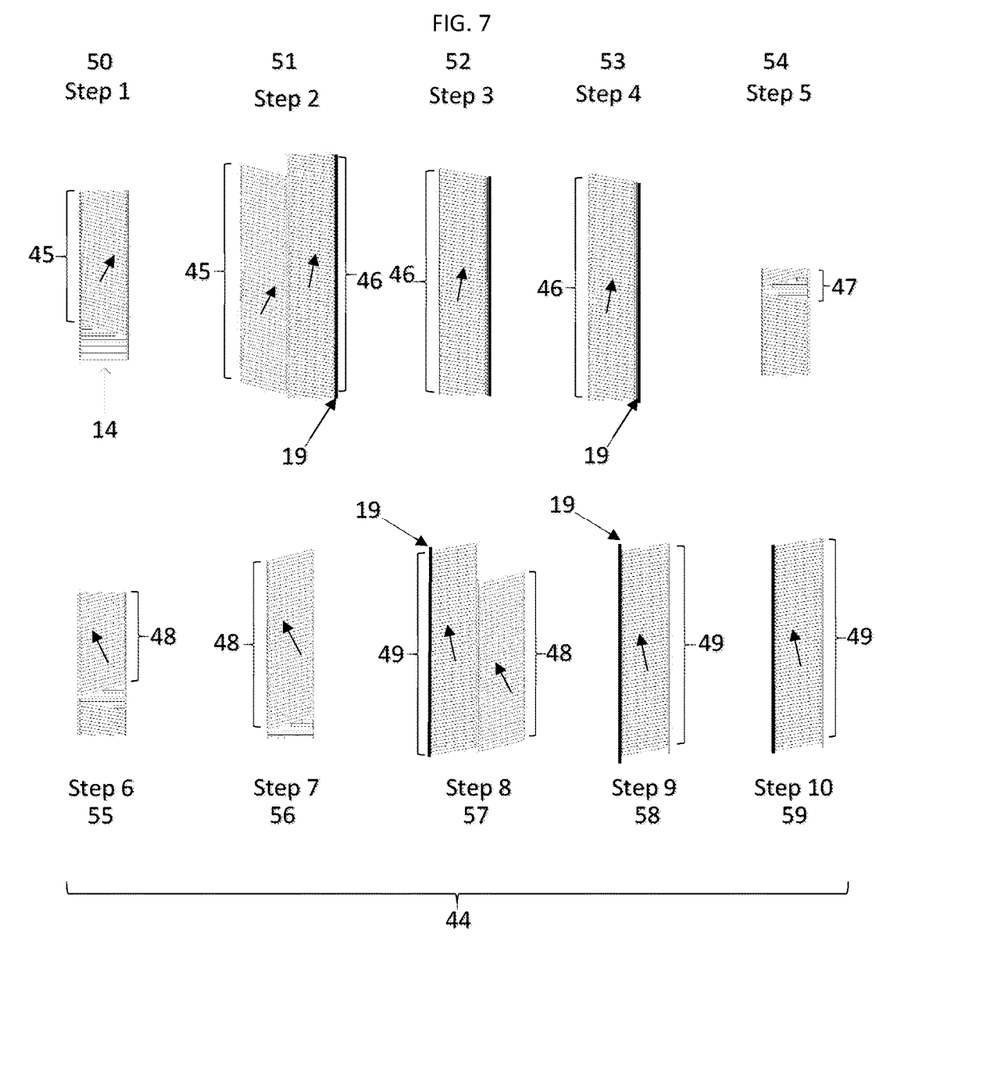
FIG. 7 is a diagram of the method of the second embodiment of the singulating process
Figure 8A:
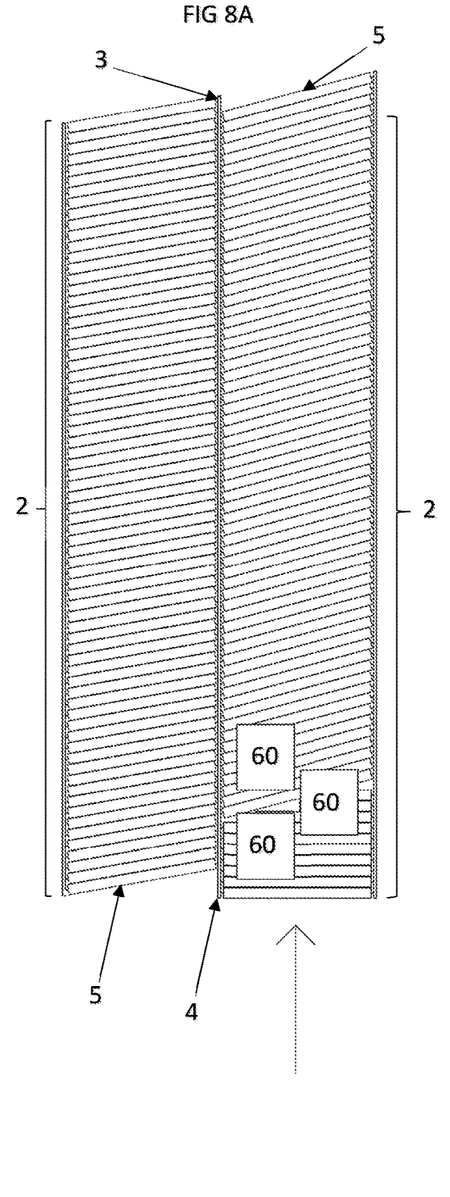
FIG. 8A is a display of packages prior to crossing a transition from one conveyor set to an adjacent conveyor set, wherein the angle of skew of the first conveyor set is less than the angle of skew of the adjacent conveyor set and the plurality of rollers of the first conveyor set operates at a slower speed than the plurality of rollers of the adjacent conveyor set.
Figure 8B:
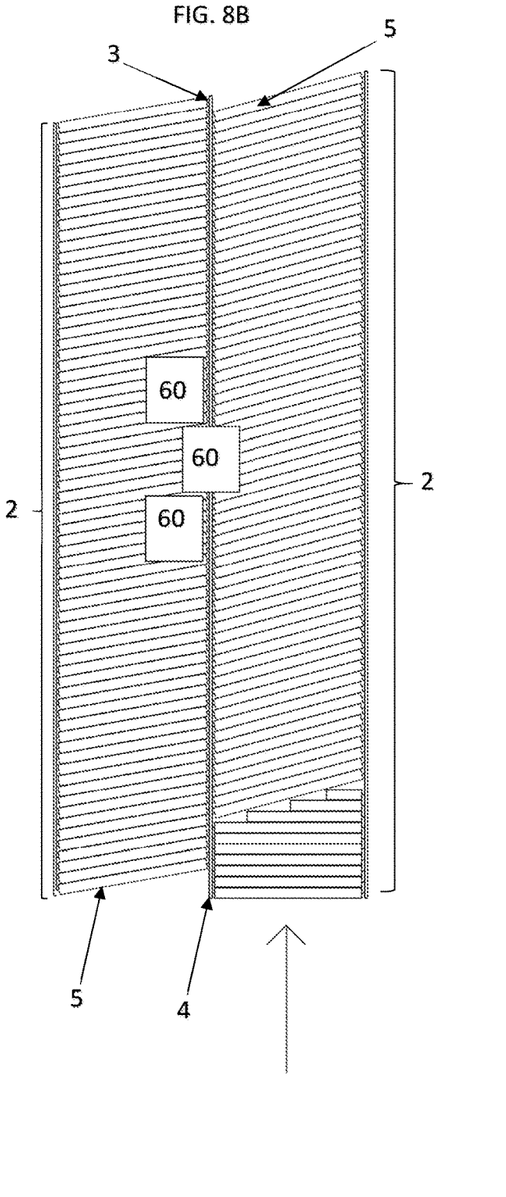
FIG. 8B is a display of packages as they cross from one conveyor to an adjacent conveyor, wherein the angle of skew of the first conveyor set is less than the angle of skew of the adjacent conveyor set and the plurality of rollers of the first conveyor set operates at a slower speed than the plurality of rollers of the adjacent conveyor set, showing how the increase in speed cause the space between packages to increase and how a package can slide between other packages as the packages cross from one conveyor to an adjacent conveyor.

The second embodiment 44 of a method of singulating and orienting jumbled, randomly oriented packages 60 into packages 60 that are conveyed in a single file line wherein each package is oriented such that the long axis of each package is oriented along the direction of flow of the conveyor system along a conveyor system comprising the following steps.

A collection of packages 60 enters a singulating system 1, wherein the singulating system comprises a first conveyor set 45, a second conveyor set 46, a transitional conveyor set 47, a third conveyor set 48, and a fourth conveyor set 49, wherein each of the conveyor sets comprise a left attachment 3, a right attachment 4, a plurality of rollers 5, and a drive 6. First 50, packages 60 enter the first conveyor set 45, wherein the plurality of rollers 5 are arranged in a skewed arrangement with an angle 12 A between the axis 9 of the plurality of rollers 5 and the right attachment 4, which directs the flow of packages 60 toward the right attachment 4.

Second 51, the packages 60 are conveyed across the right attachment 4 of the first conveyor set 45 and the left attachment of the second conveyor set 46, wherein the plurality of rollers 5 of the second conveyor set 46 are in a skewed arrangement with an angle 12 B between the axis 9 of the rollers and the right attachment 4, and the second conveyor set 46 operates a rate faster than the first conveyor set 45, which causes the space between packages 60 to increase and a package 60 can be slid into the gap between packages 60 because the angle A of the first conveyor 45 set is greater than the angle B of the second conveyor set 46.

Third 52, the packages 60 are conveyed across the second conveyor set 46, to toward the right attachment 4 because of the skewed arrangement of the plurality of rollers 5 in the second conveyor set 46.

Fourth 53, some of the packages 60 reach the right attachment 4 and are prevented from sliding off the second conveyor set 46 by a rail 19. During this time, some packages 60 move between other packages 60 as a result of the space created between packages 60 in the second step 51.

Fifth 54, the packages 60 are conveyed across a transitional conveyor set 47 wherein the rollers of this conveyor set 47 are oriented perpendicular to the direction of flow of the singulating system.

Sixth 55, the packages 60 are conveyed to the third conveyor set 48, wherein the plurality of rollers 5 of the third conveyor set 48 are in a skewed arrangement with an angle 12 Γ between the axis 9 of the plurality of rollers 5 and the left attachment 3, and the third conveyor set 48 operates at a rate faster than the rate at which the transitional conveyor set 47 operates.

Seventh 56, the packages 60 are conveyed along the third conveyor set 48 and toward the left attachment 3 of the third conveyor set 48.

Eighth 57, the packages 60 are conveyed across the left attachment 3 of the third conveyor set 48 and the right attachment 4 of the fourth conveyor set 49, wherein the plurality of rollers 5 of the fourth conveyor set 49 are in a skewed arrangement with an angle 12 Δ between the axis 9 of the plurality of rollers 5 and the left attachment 3, wherein the fourth conveyor set 49 operates a rate faster than the third conveyor set 48, which allows the space between packages 60 to increase and a package 60 can be slid into the gap between packages 60 because the angle Γ of the third conveyor 48 set is greater than the angle Δ of the fourth conveyor set 49.

Ninth 58, the packages 60 are conveyed across the fourth conveyor set 49, to toward the left attachment 3 of the fourth conveyor set 49.

Tenth 59, the packages 60 reach the left attachment 3 of the fourth conveyor set 49 and are prevented from sliding off the fourth conveyor set 49 by a rail 19. During this time, some packages 60 move between other packages 60 as a result of the space created between packages 60 in the eighth step 57.

What is claimed:

1. A singuating system for the purpose of singulating and orienting jumbled, randomly oriented packages into packages that are conveyed in a single file line comprising:
   a plurality of conveyor sets;
   each conveyor set of the plurality of conveyor sets comprising a left attachment and a right attachment, a plurality of rollers, and a drive;

each roller in the plurality of rollers comprising a left end, a right end and an axis;

the plurality of rollers being attached to the left attachment and the right attachment in such a fashion so as allow the plurality of rollers to rotate and so that the top edge of each roller creates a plane across which packages traverse;

wherein there is a first conveyor set of the plurality of conveyor sets of the singulating system, said first conveyor set comprising the plurality of rollers in a skewed arrangement, where a first angle of the rollers is A, which cause packages to travel toward the left attachment, reach the left attachment, and cross over the left attachment to the right attachment of a second conveyor set of the plurality of conveyor sets of the singulating system;

the second conveyor set comprising the plurality of rollers in a skewed arrangement wherein the second angle of the rollers in the second conveyor set is angle B, said angle being different from and greater than angle A, operates at a rate that is faster than the rate at which first conveyor set operates, causes packages to travel toward the left attachment, and wherein the second conveyor set further comprises a rail which prevents packages from sliding off;

the difference in rate between the first conveyor set and the second conveyor set causes the distance between packages to increase as packages cross from the first conveyor set to the second conveyor set;

the increase between angle A and angle B causes packages, as packages cross from the first conveyor set to the second conveyor set to be driven into the distance between packages created by the increased speed;

a first transition conveyor set within the plurality of conveyor sets, wherein the plurality of rollers are arranged perpendicularly to the direction of flow;

a third conveyor set of the plurality of conveyor sets of the singulating system that comprises the plurality of rollers in a skewed arrangement with a third angle, angle Γ, operates at a rate different from previous conveyor sets, and conveys packages toward the right attachment, across the right attachment and to a fourth conveyor set of the plurality of conveyor sets of the singulating system;

the fourth conveyor set comprising the plurality of rollers in a skewed arrangement wherein the right angle of the rollers in fourth conveyor set is angle Δ, said angle being different from and greater than angle Γ, operates at a rate that is faster than the rate at which the third conveyor set operates, conveys packages toward the right attachment, wherein the fourth conveyor set further comprise a rail to prevents packages from sliding off the conveyor set;

the difference in rate between the third conveyor set and the fourth conveyor set causes the distance between packages to increase as packages cross from the third conveyor set and the fourth conveyor set; and the greater angle Δ than angle Γ causes packages to be driven into a gap between packages.

2. A singuating system for the purpose of singulating and orienting jumbled, randomly oriented packages into packages that are conveyed in a single file line comprising:

a plurality of conveyor sets;

each conveyor set of the plurality of conveyor sets comprising a left attachment and a right attachment, a plurality of rollers, and a drive;

each roller in the plurality of rollers comprising a left end, a right end and an axis;

the plurality of rollers being attached to the left attachment and the right attachment in such a fashion so as allow the plurality of rollers to rotate and so that the top edge of each roller creates a plane across which packages traverse;

wherein there is a first conveyor set of the plurality of conveyor sets of the singulating system, said first conveyor set comprising the plurality of rollers in a skewed arrangement, wherein a first angle of the rollers is A, which cause packages to travel toward the right attachment, reach the right attachment, and cross over the right attachment to the left attachment of a second conveyor set of the plurality of conveyor sets of the singulating system;

the second conveyor set comprising the plurality of rollers in a skewed arrangement wherein a second angle of the rollers in the second conveyor set is angle B, said angle being different from and greater than angle A, operates at a rate that is faster than the rate at which first conveyor set operates, causes packages to travel toward the right attachment, and wherein the second conveyor set further comprises a rail which prevents packages from sliding off;

the difference in rate between the first conveyor set and the second conveyor set causes the distance between packages to increase as packages cross from the first conveyor set to the second conveyor set;

the increase between angle A and angle B causes packages, as packages cross from the first conveyor set to the second conveyor set to be driven into the distance between packages;

a first transition conveyor set of the plurality of conveyor sets of the singulating system, wherein rollers are arranged perpendicularly to the direction of flow;

a third conveyor set of the plurality of conveyor sets of the singulating system that comprises the plurality of rollers in a skewed arrangement with a third angle, angle Γ, which cause packages to travel toward the left attachment, operates at a rate different from previous conveyor sets, and convey packages toward the left attachment, across the left attachment and to a fourth conveyor set of the plurality of conveyor sets of the singulating system;

the fourth conveyor set comprising the plurality of rollers in a skewed arrangement wherein the fourth angle of the rollers in fourth conveyor set is angle Δ, said angle being different from and less than angle Γ, operates at a rate that is faster than the rate at which the third conveyor set, conveys packages toward the left attachment, and wherein the fourth conveyor set further comprise a rail to prevents packages from sliding off the conveyor set;

the difference in rate between the third conveyor set and the fourth conveyor set causes the distance between packages to increase as packages cross from the third conveyor set and the fourth conveyor set; and the greater angle Δ than angle Γ causes packages to be driven into a gap between packages.

3. A method of singulating packages as they are conveyed along a conveyor system, the conveyor system comprising:

a plurality of conveyor sets;

a first conveyor set of the plurality of conveyor sets comprising a left attachment, a right attachment, a plurality of rollers attached to the left attachment and the right attachment, and a drive, wherein the plurality of rollers are in a skewed arrangement with an angle A between the axis of the rollers and the left attachment, to direct packages toward the left attachment;

a second conveyor set of the plurality of conveyor sets comprising a left attachment, a right attachment, a plurality of rollers attached to the left attachment and the right attachment, and a drive, wherein the plurality of rollers are in a skewed arrangement with an angle B between the axis of the rollers and the left attachment, to direct packages toward the left attachment, said angle B being different from and greater than angle A;

a first transition conveyor set of the plurality of conveyor sets comprising a left attachment, a right attachment, a plurality of rollers attached to the left attachment and the right attachment, and a drive, wherein the plurality of rollers are oriented perpendicular to the direction packages travel;

a third conveyor set of the plurality of conveyor sets comprising a left attachment, a right attachment, a plurality of rollers attached to the left attachment and the right attachment, and a drive, wherein the plurality of rollers are in a skewed arrangement with an angle $\Gamma$ between the axis of the rollers and the right attachment, to direct packages toward the right attachment;

a fourth conveyor set of the plurality of conveyor sets comprising a left attachment, a right attachment, a plurality of rollers attached to the left attachment and the right attachment, and a drive, wherein the plurality of rollers are in a skewed arrangement with an angle $\Delta$ between the axis of the rollers and the right attachment, to direct packages toward the right attachment, said angle $\Delta$ being different from and greater than angle $\Gamma$;

wherein the method comprises: in a first step, conveying a collection of packages onto the first conveyor set of the singulating system, as the packages traverse along the first conveyor set, the flow of packages is toward the left attachment as a result of the skewed nature of the plurality of rollers;

in a second step, conveying the packages across the left attachment of first conveyor set and the right attachment of the second conveyor set, wherein the plurality of rollers of second conveyor set, which are arranged in a skewed arrangement, operates a rate faster than first conveyor set, the difference in rate between the first conveyor set and the second conveyor set causes the distance between packages to increase as packages cross from the first conveyor set to the second conveyor set, the change between angle A of the first conveyor set and angle B of the second conveyor set causes packages, as packages cross from the first conveyor set to the second conveyor set to be driven into the distance between packages;

in a third step, conveying the packages along the second conveyor set and across the second conveyor set toward the left attachment by the plurality of rollers arranged in a skewed arrangement;

in a fourth step, conveying some of the packages so that the packages reach the left attachment and are stopped by a rail while all of the packages are conveyed by the plurality of rollers along the second conveyor set;

in a fifth step, conveying the packages along the conveyor across the first transitional conveyor set of the plurality of conveyor sets;

in a sixth step, conveying the packages across the first transitional conveyor set by the plurality of rollers to the third conveyor set of the plurality of conveyor sets;

in a seventh step, conveying the packages along the third conveyor set by the plurality of rollers arranged in a skewed arrangement and toward the right attachment;

in an eighth step, conveying the packages by the rotation of the plurality of rollers arranged in a skewed arrangement across the right attachment of third conveyor set and the left attachment of the fourth conveyor set or the plurality of conveyor sets, wherein the plurality of rollers arranged in s skewed arrangement of the fourth conveyor set operates a rate faster than third conveyor set and the plurality of rollers of the fourth conveyor set are arranged at an angle $\Delta$, greater than the angle $\Gamma$ of the third conveyor set;

in a ninth step, conveying the packages by the rotation of the plurality of rollers arranged in a skewed arrangement across the fourth conveyor set, to toward the right attachment; and in a tenth step, conveying the packages along the fourth conveyor set and across the fourth conveyor set, by the rotation of the plurality of skewed rollers of the fourth conveyor set, wherein the packages reach the right attachment and are stopped from sliding off the singulating system by a rail.

4. A method of singulating packages as they are conveyed along a conveyor system, the conveyor system comprising:

a first conveyor set of the plurality of conveyor sets comprising a left attachment, a right attachment, a plurality of rollers attached to the left attachment and the right attachment, and a drive, wherein the plurality of rollers are in a skewed arrangement with an angle A between the axis of the rollers and the right attachment, to direct packages toward the right attachment;

a second conveyor set of the plurality of conveyor sets comprising a left attachment, a right attachment, a plurality of rollers attached to the left attachment and the right attachment, and a drive, wherein the plurality of rollers are in a skewed arrangement with an angle B between the axis of the rollers and the right attachment, to direct packages toward the right attachment, said angle being different from and greater than angle A;

the first transition conveyor set comprising a left attachment, a right attachment, a plurality of rollers attached to the left attachment and the right attachment, and a drive, wherein the plurality of rollers are oriented perpendicular to the direction packages travel;

a third conveyor set comprising a left attachment, a right attachment, a plurality of rollers attached to the left attachment and the right attachment, and a drive, wherein the plurality of rollers are in a skewed arrangement with an angle $\Gamma$ between the axis of the rollers and the left attachment, to direct packages toward the left attachment;

a fourth conveyor set comprising a left attachment, a right attachment, a plurality of rollers attached to the left attachment and the right attachment, and a drive, wherein the plurality of rollers are in a skewed arrangement with an angle $\Delta$ between the axis of the rollers and the left attachment, to direct packages toward the left attachment, said angle being different from and greater than angle $\Gamma$;

wherein the method comprises: in a first step, conveying a collection of packages onto the first conveyor set of the singulating system, which directs the flow of packages toward the right attachment;

in a second step, conveying the packages across the right attachment of first conveyor set and the left attachment of the second conveyor set, wherein the plurality of rollers of second conveyor set, which are arranged in a skewed arrangement, operates a rate faster than first conveyor set, the difference in rate between the first conveyor set and the second conveyor set causes the distance between packages to increase as packages cross from the first conveyor set to the second conveyor set, the change between angle A of the first conveyor set and angle B of the second conveyor set causes packages, as packages cross from the first conveyor set to the second conveyor set to be driven into the distance between packages;

in a third step, conveying the packages along the first conveyor and across the second conveyor set, toward the right attachment by the plurality of rollers arranged in a skewed arrangement;

in a fourth step, conveying some of the packages so that the packages reach the right attachment and are stopped by a rail while all of the packages are conveyed by the plurality of rollers along the second conveyor set;

in a fifth step, conveying the packages across the first transitional conveyor set;

in a sixth step, conveying the packages across the first transitional conveyor set by the plurality of rollers to the third conveyor set;

in a seventh step, conveying the packages along third conveyor set by the plurality of rollers arranged in a skewed arrangement and toward the left attachment;

in an eighth step, conveying the packages by the rotation of the plurality of rollers arranged in a skewed arrangement across the left attachment of third conveyor set and the right attachment of the fourth conveyor set, wherein the plurality of rollers arranged in a skewed arrangement of the fourth conveyor set operates a rate faster than third conveyor set and the plurality or rollers of the fourth conveyor set are arranged at an angle $\Delta$, greater than the angle $\Gamma$ of the third conveyor set;

in a ninth step, conveying the packages by the rotation of the plurality of rollers arranged in a skewed arrangement across fourth conveyor set, toward the left attachment; and in a tenth step, conveying the packages by the rotation of the plurality of skewed rollers of along the fourth conveyor set and across the fourth conveyor set until the packages reach the left attachment and are stopped from sliding off the singulating system by a rail.

\* \* \* \* \*